US008667511B2

(12) United States Patent
Khanvilkar et al.

(10) Patent No.: US 8,667,511 B2
(45) Date of Patent: Mar. 4, 2014

(54) SAS SMP TUNNELING USING SCSI COMMANDS

(75) Inventors: Saurabh Balkrishna Khanvilkar, Thane (IN); Prasad Ramchandra Kadam, Pune (IN); Mandar Dattatraya Joshi, Pune (IN)

(73) Assignee: LSI Corporation, San Jose, CA (US)

( * ) Notice: Subject to any disclaimer, the term of this patent is extended or adjusted under 35 U.S.C. 154(b) by 585 days.

(21) Appl. No.: 12/884,704

(22) Filed: Sep. 17, 2010

(65) Prior Publication Data

US 2012/0072924 A1    Mar. 22, 2012

(51) Int. Cl.
*G06F 3/00* (2006.01)

(52) U.S. Cl.
USPC .......................................... 719/326; 719/313

(58) Field of Classification Search
None
See application file for complete search history.

(56) References Cited

U.S. PATENT DOCUMENTS

| 7,743,178 | B2 | 6/2010 | Warren et al. | |
|---|---|---|---|---|
| 2004/0193736 | A1* | 9/2004 | Galloway | 710/1 |
| 2005/0228924 | A1* | 10/2005 | Marushak et al. | 710/300 |
| 2007/0064623 | A1* | 3/2007 | Brahmaroutu | 370/254 |
| 2007/0100847 | A1* | 5/2007 | Slutz et al. | 707/100 |
| 2008/0120687 | A1* | 5/2008 | Johnson | 726/1 |

OTHER PUBLICATIONS

SCSI commands Reference Manual, Seagate, Feb. 2006, pp. 1-362.*

* cited by examiner

*Primary Examiner* — Tuan Dao
(74) *Attorney, Agent, or Firm* — Suiter Swantz pc llo

(57) ABSTRACT

A storage system comprising: a SCSI initiator being configured for receiving a data request and providing a SMP request corresponding to the data request, the SCSI initiator being further configured for encapsulating the SMP request into a first SCSI command; a SCSI target being configured for receiving the first SCSI command, the SCSI target being further configured for recognizing encapsulation of the SMP request and obtaining the SMP request from the first SCSI command; and an SMP target being configured for processing the SMP request and providing an SMP response to the SCSI target. The SCSI target being further configured for acknowledging the SCSI initiator upon reception of the SMP response; and the SCSI initiator being further configured for sending a second SCSI command to the SCSI target to retrieve the SMP response.

20 Claims, 3 Drawing Sheets

SAS SMP TUNNELING USING SCSI COMMANDS

TECHNICAL FIELD

The present invention relates to the field of storage systems and particularly to a system and method for providing SMP tunneling utilizing SCSI commands.

BACKGROUND

Small Computer System Interface (SCSI) provides a set of standards for connecting and transferring data between computers and peripheral devices. A SCSI command is the basic unit of communication in a SCSI storage system. The SCSI Primary Command Set defines and maintains a set of standard SCSI commands.

Serial Attached SCSI (SAS) is a computer bus used to move data to and from computer storage devices. One of the protocols utilized by SAS is the SAS/Serial Management Protocol (SMP). SMP may be regarded as a newer protocol compare to the standard SCSI commands.

SUMMARY

Accordingly, an embodiment of the present disclosure is directed to a storage system. The storage system may comprise a Small Computer System Interface (SCSI) initiator, the SCSI initiator being configured for receiving a data request and providing a Serial Management Protocol (SMP) request corresponding to the data request, the SCSI initiator being further configured for encapsulating the SMP request into a first SCSI command. The storage system may also comprise a SCSI target communicatively connected to the SCSI initiator, the SCSI target being configured for receiving the first SCSI command from the SCSI initiator, the SCSI target being further configured for recognizing encapsulation of the SMP request and obtaining the SMP request from the first SCSI command. The storage system may further comprise an SMP target communicatively coupled with the SCSI target, the SMP target being configured for processing the SMP request and providing an SMP response to the SCSI target. The SCSI target being further configured for acknowledging the SCSI initiator upon reception of the SMP response; and the SCSI initiator being further configured for sending a second SCSI command to the SCSI target to retrieve the SMP response.

A further embodiment of the present disclosure is directed to a method. The method may comprise receiving a data request; generating a Serial Management Protocol (SMP) request corresponding to the data request; encapsulating the SMP request into a first SCSI command; sending the first SCSI command to a SCSI target, the SCSI target configured for recognizing encapsulation of the SMP request and obtaining the SMP request from the first SCSI command, the SCSI target further configured for sending the SMP request to an SMP target for processing and receiving an SMP response from the SMP target upon completion of said processing; receiving an acknowledgment from the SCSI target upon reception of the SMP response; and sending a second SCSI command to the SCSI target to retrieve the SMP response.

An additional embodiment of the present disclosure is directed to a method. The method may comprise receiving a first SCSI command from a SCSI initiator, the first SCSI command having a Serial Management Protocol (SMP) request encapsulated therein; obtaining the SMP request from the first SCSI command; sending the SMP request to an SMP target, the SMP target configured for processing the SMP request and generating an SMP response; receiving the SMP response from the SMP target; acknowledging the SCSI initiator upon reception of the SMP response; receiving a second SCSI command from the SCSI initiator requesting for the SMP response; and sending the SMP response to the SCSI initiator in response to the second SCSI command.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The present disclosure is directed to a system and method for providing SMP tunneling utilizing SCSI commands. Tunneling may generally refer to operations where one protocol/command encapsulates a different protocol/command. SMP tunneling as described in the present disclosure encapsulates an SMP request within a SCSI command, allowing the encapsulated SMP request to be communicated over a SCSI storage system. Since SMP is a newer protocol as compared to the standard SCSI commands, SMP tunneling may be appreciated by users who may be more comfortable using the SCSI commands.

Figure 1:
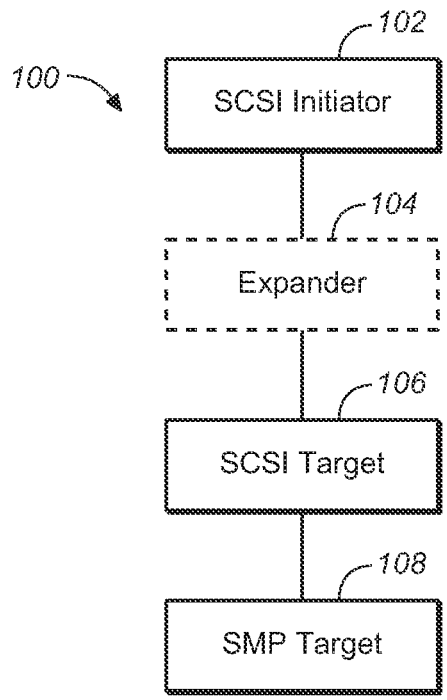
FIG. 1 is a block diagram illustrating a storage system configured for providing SMP tunneling utilizing SCSI commands.

Referring to FIG. 1, a block diagram illustrating a storage system 100 is shown. The storage system 100 may comprise a SCSI initiator 102, at least one SCSI target 106 communicatively connected to the SCSI initiator 102, and an SMP target 108 communicatively coupled with the SCSI target 106. The SMP target 108 may be an internal component of the SCSI target (e.g., a built-in SMP target). Alternatively, the SMP target 108 may be an external device communicatively connected to the SCSI target 106, in which case the SCSI target 106 may include a built-in SMP Initiator component to facilitate the communication with the SMP target 108.

Upon receiving a trigger (e.g., a data request from an application layer), the SCSI initiator 102 prepares/generates one or more SMP request corresponding to the received trigger. For example, a trigger may perform host-based discovery. This will start-off with sending REPORT GENERAL SMP followed by DISCOVER SMPs for individual expander PHYs. Another example could be using PHY CONTROL SMP for enabling/disabling an Expander PHY. The SCSI initiator 102 may then encapsulate the SMP request into a first SCSI command.

The first SCSI command may be any SCSI command capable of carrying a payload (i.e., the SMP request) and specifying a vendor-specific identification. In one embodiment, the first SCSI command is the SCSI WRITE_BUFFER command (SCSI command operation code "3Bh"). The SMP request may be encapsulated in the payload field of the WRITE_BUFFER command and the vendor-specific identification may be specified in the buffer identification (BUFFER ID) field of the WRITE_BUFFER command. In another embodiment, the first SCSI command is the SCSI SEND_DIAGNOSTIC command (SCSI command operation code "1Dh"). The SMP request may be encapsulated in the payload field of the SEND_DIAGNOSTIC command and the vendor-specific identification may be specified in the page code field of the SEND_DIAGNOSTIC command. It is contemplated that other SCSI commands may be utilized for carrying the SMP request and specifying the vendor-specific identification without departing from the spirit and scope of the present disclosure.

Once the first SCSI command is generated, the SCSI initiator 102 sends the first SCSI command to the SCSI target 106. Upon receiving the first SCSI command, the SCSI target 106 recognizes the vendor-specific identification specified in the command and realizes that the command has an SMP request specified in the payload field. The SCSI target 106 then obtains the SMP request from the payload field and sends the SMP request to the SMP target 108. The SMP target 108 then processes the SMP request and provides an SMP response to the SCSI target 106. The SCSI target 106 may save the SMP response and acknowledge the SCSI initiator 102 that the request has been executed.

The SCSI initiator 102 is configured to send a second SCSI command to the SCSI target 106 to retrieve the SMP response upon receiving the acknowledgment. The second SCSI command may be any SCSI command capable of specifying the vendor-specific identification identical to that of the first SCSI command. In response to the second SCSI command, the SCSI target 106 provides the SMP response to the SCSI initiator 102 to complete the request.

In one embodiment, the second SCSI command is the SCSI READ_BUFFER command (SCSI command operation code "3Ch"), and the vendor-specific identification (identical to that of the first SCSI command) may be specified in the buffer identification (BUFFER ID) field of the READ_BUFFER command. In another embodiment, the second SCSI command is the SCSI RECEIVE_DIAGNOSTIC command (SCSI command operation code "1Ch"), and the vendor-specific identification may be specified in the page code field of the RECEIVE_DIAGNOSTIC command. It is contemplated that other SCSI commands may be utilized for specifying the vendor-specific identification without departing from the spirit and scope of the present disclosure.

It is contemplated that the SCSI initiator 102 and the SCSI target 106 may be connected via one or more expanders 104. The expanders 104 (if utilized) do not interfere with the operations of SMP tunneling. There may be any number of expanders 104 between the SCSI initiator 102 and the SCSI target 106. The SCSI command (which may contain a tunneled SMP request) is to be processed by the intended SCSI target, and any number of in-between expanders will not interfere with this command and will simply route the command (pass-through) till it reaches the intended SCSI target.

Figure 2:
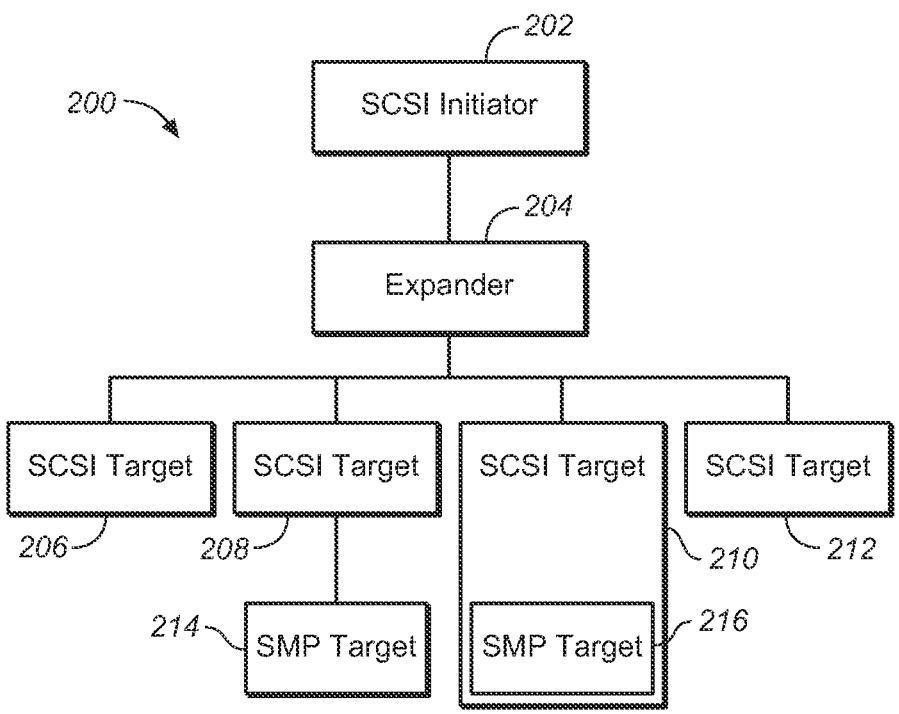
FIG. 2 is a block diagram illustrating another storage system configured for providing SMP tunneling utilizing SCSI commands.

Referring to FIG. 2, a block diagram illustrating an exemplary layout of a storage system 200 is shown. The storage system 200 may comprise a SCSI initiator 202 and a plurality of SCSI targets (206, 208, 210 and 212) connected to the SCSI initiator 202 via an expander 204. Furthermore, SCSI target 208 may be communicatively connected to an external SMP target 214; and SCSI target 210 may comprise an internal SMP target 216.

In one example, if the SCSI initiator 202 receives a trigger (e.g., from an application layer) requesting access to the SMP target 214, the SCSI initiator 202 may generate an SMP request and encapsulate/tunnel the SMP request into a WRITE_BUFFER command. This WRITE_BUFFER command may be routed to the SCSI target 208, which recognizes that an SMP request is specified in the payload field of this WRITE_BUFFER command. The SCSI target 208 then obtains/extracts the SMP request from the WRITE_BUFFER command, and sends the SMP request to the SMP target 214 for processing. Upon completion of the process, the SMP target 214 may send an SMP response to the SCSI target 208. The SCSI target 208 may acknowledge the SCSI initiator 202, and the SCSI initiator 202 may generate and send a READ_BUFFER command to the SCSI target 208 to retrieve the SMP response.

Similarly, if the SCSI initiator 202 receives another trigger requesting access to the SMP target 216, the SCSI initiator 202 may generate another SMP request and encapsulate/tunnel this SMP request into another WRITE_BUFFER command. This WRITE_BUFFER command may be routed to the SCSI target 210, which recognizes that an SMP request is specified in the payload field of this WRITE_BUFFER command. The SCSI target 210 then obtains/extracts the SMP request from the WRITE_BUFFER command, and sends the SMP request to the SMP target 216 for processing. Upon completion of the process, the SMP target 216 may send an SMP response to the SCSI target 210. The SCSI target 210 may acknowledge the SCSI initiator 202, and the SCSI initiator 202 may generate and send another READ_BUFFER command to the SCSI target 210 to retrieve the SMP response.

Figure 3:
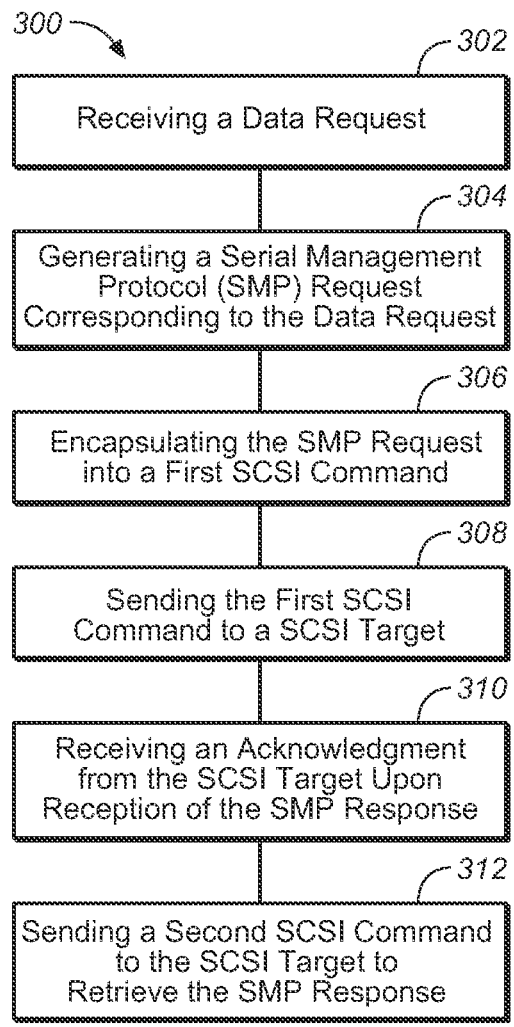
FIG. 3 is a flow chart illustrating a method performed by a SCSI initiator for providing SMP tunneling utilizing SCSI commands.

FIG. 3 shows a flow diagram illustrating steps performed by a SCSI initiator in accordance with the present disclosure. The SCSI initiator may receive a data request in step 302 and generate an SMP request corresponding to the data request in step 304. The SCSI initiator may then encapsulate the SMP request into a first SCSI command in step 306. In one embodiment, the first SCSI command may be a WRITE_BUFFER command or a SEND_DIAGNOSTIC command, as previously described.

The SCSI initiator may send the first SCSI command to a SCSI target in step 306. The SCSI target may be configured for recognizing encapsulation of the SMP request and obtaining the SMP request from the first SCSI command. The SCSI target may be further configured for sending the SMP request to an SMP target for processing and receiving an SMP response from the SMP target upon completion of the process.

Once the SCSI initiator receives an acknowledgment from the SCSI target upon reception of the SMP response in step 310, the SCSI initiator may generate and send a second SCSI command to the SCSI target to retrieve the SMP response in step 312. In one embodiment, the second SCSI command may be a READ_BUFFER command or a RECEIVE_DIAGNOSTIC command, as previously described.

Figure 4:
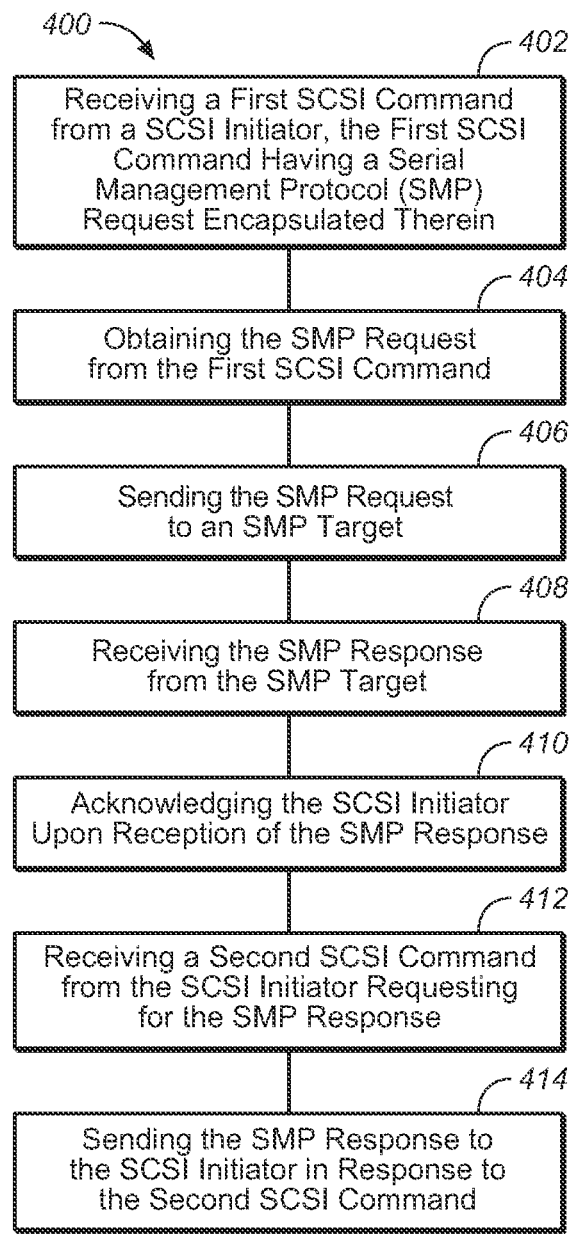
FIG. 4 is a flow chart illustrating a method performed by a SCSI target for providing SMP tunneling utilizing SCSI commands.

FIG. 4 shows a flow diagram illustrating steps performed by a SCSI target in accordance with the present disclosure. The SCSI target may receive a first SCSI command from a SCSI initiator in step 402. The first SCSI command may include an SMP request encapsulated therein. The SCSI target may obtain/extract the SMP request from the first SCSI command in step 404 and send the SMP request to an SMP target for processing in step 406. The SMP target may process the SMP request and generating an SMP response.

Upon receiving the SMP response from the SMP target in step 408, the SCSI target may acknowledge the SCSI initiator in step 410. The SCSI target may then receive a second SCSI command from the SCSI initiator in step 412 requesting for the SMP response. The SCSI target may send the SMP response to the SCSI initiator in response to the second SCSI command in step 414 to complete the process.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A storage system, comprising:
   a Small Computer System Interface (SCSI) initiator device, the SCSI initiator device including a computer processor configured for: receiving a data request, providing a Serial Management Protocol (SMP) request corresponding to the data request, and encapsulating the SMP request into a first SCSI command;
   a SCSI target device communicatively connected to the SCSI initiator device, the SCSI target device including a computer processor configured for: receiving the first SCSI command from the SCSI initiator device, recognizing encapsulation of the SMP request, and obtaining the SMP request from the first SCSI command;
   an SMP target device communicatively coupled with the SCSI target device, the SMP target device including a computer processor configured for: processing the SMP request and providing an SMP response to the SCSI target device;
   the computer processor of the SCSI target device being further configured for acknowledging the SCSI initiator device upon reception of the SMP response from the SMP target device; and
   the computer processor of the SCSI initiator device being further configured for sending a second SCSI command to the SCSI target device to retrieve the SMP response, wherein the SCSI initiator device communicates with the SCSI target device under a standard SCSI protocol, and the SCSI target device communicates with the SMP target device under a SMP protocol.

2. The storage system of claim 1, wherein the first SCSI command is a WRITE_BUFFER command comprising a payload field and a buffer identification field, the WRITE_BUFFER command configured for carrying the SMP request in the payload field and specifying a vendor-specific identification in the buffer identification field.

3. The storage system of claim 2, wherein the computer processor of the SCSI target device is configured for recognizing encapsulation of the SMP request based on the vendor-specific identification.

4. The storage system of claim 2, wherein the second SCSI command is a READ_BUFFER command comprising a buffer identification field, the READ_BUFFER command configured for specifying said vendor-specific identification in the buffer identification field of the READ_BUFFER command.

5. The storage system of claim 1, wherein the first SCSI command is a SEND_DIAGNOSTIC command comprising a payload field and a page code field, the SEND_DIAGNOSTIC command configured for carrying the SMP request in the payload field and specifying a vendor-specific identification in the page code field.

6. The storage system of claim 5, wherein the computer processor of the SCSI target device is configured for recognizing encapsulation of the SMP request based on the vendor-specific identification.

7. The storage system of claim 5, wherein the second SCSI command is a RECEIVE_DIAGNOSTIC command comprising a page code field, the RECEIVE_BUFFER command configured for specifying said vendor-specific identification in the page code field of the RECEIVE_DIAGNOSTIC command.

8. The storage system of claim 1, wherein the SCSI target device is communicatively connected to the SCSI initiator device via at least one expander.

9. The storage system of claim 1, wherein the SMP target device is at least one of: an internal component of the SCSI target device; and an external device communicatively connected to the SCSI target device.

10. A method, comprising:
   receiving a data request;
   generating a Serial Management Protocol (SMP) request corresponding to the data request;
   encapsulating the SMP request into a first SCSI command;
   sending the first SCSI command to a SCSI target, the SCSI target configured for recognizing encapsulation of the SMP request and obtaining the SMP request from the first SCSI command, the SCSI target further configured for sending the SMP request to an SMP target for processing and receiving an SMP response from the SMP target upon completion of said processing;
   receiving an acknowledgment from the SCSI target upon reception of the SMP response; and
   sending a second SCSI command to the SCSI target to retrieve the SMP response,
   wherein said first SCSI command sent to the SCSI target, said acknowledgment received from the SCSI target, and said second SCSI command sent to the SCSI target are standard SCSI commands, and wherein said SMP request sent from the SCSI target to the SMP target and said SMP response received by the SCSI target from the SMP target are SMP commands.

11. The method of claim 10, wherein the first SCSI command is a WRITE_BUFFER command comprising a payload field and a buffer identification field, the WRITE_BUFFER command configured for carrying the SMP request in the payload field and specifying a vendor-specific identification in the buffer identification field.

12. The method of claim 11, wherein the second SCSI command is a READ_BUFFER command comprising a buffer identification field, the READ_BUFFER command configured for specifying said vendor-specific identification in the buffer identification field of the READ_BUFFER command.

13. The method of claim 10, wherein the first SCSI command is a SEND_DIAGNOSTIC command comprising a payload field and a page code field, the SEND_DIAGNOSTIC command configured for carrying the SMP request in the payload field and specifying a vendor-specific identification in the page code field.

14. The method of claim 13, wherein the second SCSI command is a RECEIVE_DIAGNOSTIC command comprising a page code field, the RECEIVE_BUFFER command configured for specifying said vendor-specific identification in the page code field of the RECEIVE_DIAGNOSTIC command.

15. The method of claim 10, wherein the SMP target is at least one of: an internal component of the SCSI target; and an external device communicatively connected to the SCSI target.

16. A method, comprising:
receiving a first SCSI command from a SCSI initiator, the first SCSI command having a Serial Management Protocol (SMP) request encapsulated therein;
obtaining the SMP request from the first SCSI command;
sending the SMP request to an SMP target, the SMP target configured for processing the SMP request and generating an SMP response;
receiving the SMP response from the SMP target;
acknowledging the SCSI initiator upon reception of the SMP response;
receiving a second SCSI command from the SCSI initiator requesting for the SMP response; and
sending the SMP response to the SCSI initiator in response to the second SCSI command,
wherein said first SCSI command received from the SCSI initiator, said acknowledgment to the SCSI initiator, and said second SCSI command received from the SCSI initiator are standard SCSI commands, and wherein said SMP request sent to the SMP target and said SMP response received from the SMP target are SMP commands.

17. The method of claim 16, wherein the first SCSI command is a WRITE_BUFFER command comprising a payload field and a buffer identification field, the WRITE_BUFFER command configured for carrying the SMP request in the payload field and specifying a vendor-specific identification in the buffer identification field.

18. The method of claim 17, wherein the second SCSI command is a READ_BUFFER command comprising a buffer identification field, the READ_BUFFER command configured for specifying said vendor-specific identification in the buffer identification field of the READ_BUFFER command.

19. The method of claim 16, wherein the first SCSI command is a SEND_DIAGNOSTIC command comprising a payload field and a page code field, the SEND_DIAGNOSTIC command configured for carrying the SMP request in the payload field and specifying a vendor-specific identification in the page code field.

20. The method of claim 19, wherein the second SCSI command is a RECEIVE_DIAGNOSTIC command comprising a page code field, the RECEIVE_BUFFER command configured for specifying said vendor-specific identification in the page code field of the RECEIVE_DIAGNOSTIC command.

* * * * *